United States Patent Office 3,100,801
Patented Aug. 13, 1963

3,100,801
α,Ω-HALOPOLYTHIOETHERS
Walter Reifschneider, Midland, Mich., assignor to The Dow Chemical Company, Midland, Mich., a corporation of Delaware
No Drawing. Filed June 27, 1962, Ser. No. 205,499
6 Claims. (Cl. 260—609)

The present invention is directed to polymeric thioethers and in particular is directed to novel thioethers corresponding to the formula

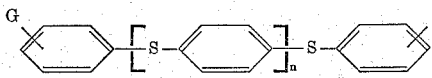

In the present specification and claims, G represents a halogen of molecular weight between 10 and 100, and $n$ represents an integer from 1 to 7, inclusive. The compounds are thus the doubly halophenyl terminated linear p-phenylene sulfides, and linear poly(p-phenylene sulfide) polymers.

The novel compounds are colorless or lightly colored crystalline solids, or occasionally very viscous liquids or glasses, appearing white to pale yellow in mass, very slightly soluble in water but readily soluble in various common organic solvents such as benzene and the like. The compounds are useful as insecticides and fungicides. Various of them are virucidal. Also, they are useful as algicides and in this use they are of particular interest because they are strongly toxic to algae in concentrations at which they are without effect upon more highly organized plants including seed-bearing aquatic plants. They are useful as intermediates in the preparation of dyestuffs and biologically active phosphate materials; they are also of value as solvent additives in the modification of behavior of mixed solvent systems.

The compounds are prepared by a halide-thiol condensation process which comprises the step of causing a reaction between aromatic dihalide which is a dihalobenzene of the formula

or an α,Ω-bis(halophenyl)polyphenylene sulfide compound corresponding to the formula

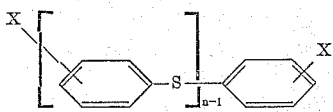

wherein X represents a halogen of molecular weight greater than 25; and a halobenzenethiol compound of the formula

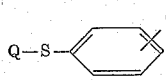

wherein Q is hydrogen, alkali metal, or cuprous copper and wherein G has the value previously stated, subject to the limitation that the halogen X is of molecular weight greater than 25 and, in any particular reaction mixture, greater than G. During the reaction to prepare the present compounds, a molecule of halobenzenethiol compound reacts with, and at the site of, each halogen X. Small amounts of halobenzenethiol compound may be lost in side reactions. Thus, when it is desired to prepare the present compounds in a high state of purity and with a minimum of necessary post-synthesis purification procedure, the starting reactants should be employed in the proportion of 2 molecules of halobenzenethiol per molecule of aromatic dihalide, or preferably, with the benzenethiol in slight excess.

The α,Ω-bis(halophenyl)polyphenylene sulfide starting materials are readily prepared by a synthesis which represents essentially a particular employment of the synthetic methods used in preparation of the present products; a method which will be understood by chemists in view of the following synthetic scheme, understood in light of the teachings herewith:

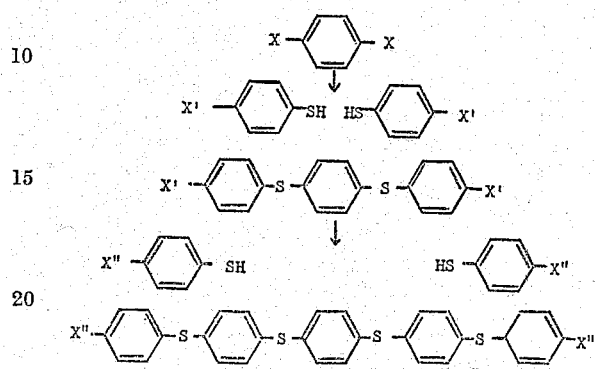

In the foregoing scheme, X, X′ and X″ are all halogens of molecular weight descending in the order indicated.

While the foregoing scheme shows the preparation of compounds that are symmetrical with respect to a central phenylene nucleus, compounds that are symmetrical with respect to a central sulfide linkage are also readily prepared according to the scheme

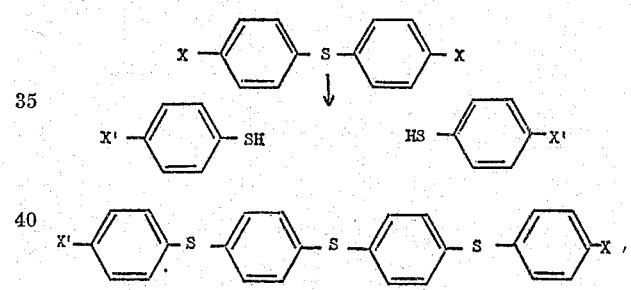

and so forth.

When the compounds of the present invention are built up by such reaction or successive reaction of a dihalobenzene and one or more halobenzenethiols, when the intended terminal halogens are identical. The maximum number of phenylene groups that can be linked serially to form a product of the present invention can easily be determined, by the following equation:

$$y = \frac{.693 \cdot \left(\frac{1}{w} \cdot 101\right) + 160}{75}$$

when $y$ is the number of phenylene groups and $w$ is the atomic weight of one of two identical halogens. The value $y$ is a close approximation and is to be rounded to the nearest small whole number. The error introduced by the use of a factor of 0.7 instead of the indicated .693 is usually insignificant.

When the terminal halogens are not identical, results that are approximately accurate are had by using as $w$ an average value of the two different molecular weights.

When it is desired to prepare compounds of the present invention of which the terminal halogens are of molecular weight greater, for length of polyphenylene sulfide chain, than is indicated in the foregoing formula, the compounds are prepared by starting with terminally halogenated polyphenylene sulfide chains rather than, as indicated in the formula, with dihalobenzenes.

The halide-thiol condensation goes forward at temperatures over a wide range such as from 30° to 350° C., but initiates most readily at a temperature somewhat higher than room temperature. A preferred temperature range is about 130° to 230° C. Under these conditions the reaction is, in general, exothermic and goes forward to completion with good yield calculated upon the basis of consumed starting material. When Q is hydrogen, hydrogen halide of reaction is evolved and means for its orderly disposal are advantageously provided.

Typically, in the preparation of the compounds of the present invention, reaction between the thiol starting material and the aromatic halide starting material which may be an $\alpha,\Omega$-dihalopolyphenylene sulfide chain will initiate and go forward only when there is employed a catalytic amount of both a source of cuprous ion and a nitrogenous base. Thus, in the prepartion of many, and probably all of the present compounds, the employment of a catalytic amount of such catalyst is essential and critical, although the exact weight is not critical. Certainly the employment of such catalyst is in all cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salt may be employed. The employed weight is not critical, but may vary from a very small trace amount, less than 1/100 of 1 mole percent, to as much as an amount equimolecular with either reactant or even greater. In general, the employment of larger amounts is accompanied by no major advantage and, being expensive, is not preferred.

The nitrogenous base may be ammonia, a primary, secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise, such base is dissolved in inert liquid reaction medium, such as a hydrocarbon oil.

It is preferred, at least in laboratory procedures, to employ the nitrogenous base catalyst substance in sufficient excess that portions of it may also act as hydrogen halide acceptor and yet further portions may continue to function, unreacted, in the necessary catalytic manner.

In carrying out the reaction to prepare the compounds of the present invention, the aromatic halide and the halobenzenethiol compound are intimately mixed and blended, in any order and in desired amounts, with source of cuprous ion and nitrogenous base as hereinbefore described, preferably nitrogenous base catalytic reaction medium; and thereafter heated to a temperature at which reaction takes place promptly. In one convenient method of practicing the present method, the reaction temperature may be the reflux temperature of the liquid reaction medium. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate usually forms from which the desired product can be extracted as a solvent-soluble fraction. Representative solvents include diethyl ether, chlorinated hydrocarbons, and benzene. In any event, the product can be extracted with solvent, the solvent extract dried over an inert drying agent such as, for example, anhydrous potassium carbonate or the like; the solvent vaporized and removed and the remaining product chilled or otherwise induced to crystallize and, if desired, recrystallized from a solvent such as a lower alkanol; or the product can be distilled in vacuum.

When production of the present compounds is to be carried out on an industrial scale, various other methods of separation and purification may be preferred, including, for example, centrifugation, decantation, azeotropic distillation, and the like.

The following examples, without more, will enable those skilled in the art to practice the present invention.

EXAMPLE I

*1,4-Bis(p-Chlorophenylthio)Benzene*

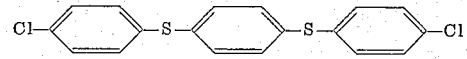

A reaction mixture is prepared, consisting of 23.6 grams (0.1 mole) of p-dibromobenzene, 16 grams of cuprous oxide (technical grade, about 90% CuO) and 29 grams (approximately 0.2 mole) of p-chlorobenzenethiol dispersed in a mixture consisting of 140 milliliters lutidine (technical grade) and 60 milliliters quinoline. The resulting reaction mixture is placed in a flask under reflux, the reflux being equipped with a water trap. In this situation, the reaction mixture is heated at its reflux temperature (a pot temperature of approximately 170° C.) for 6 hours to carry the reaction to completion. At the end of this reaction period, the resulting hot mixture is poured into a mixture of shaved ice and excess (200 milliliters) concentrated hydrochloric acid. The resulting mixture is stirred for several hours. As a result of these procedures, the ice melts and basic substances react with hydrochloric acid; in the resulting aqueous mixture a precipitate forms. The precipitate is collected by filtration and is exhaustively extracted with dichloromethane, the extract liquid being saved. This liquid is repeatedly washed with 5% hydrochloric acid, and then dried over a bed of anhydrous potassium carbonate which also neutralizes remaining traces of acidic substances; the resulting liquid is warmed to vaporize and remove dichloromethane solvent and obtain a crude solid product in nearly theoretically perfect yield. The product is recrystallized successively from acetic acid and carbon tetrachloride, to obtain a 1,4-bis(p-chlorophenylthio)benzene as white crystals melting at 135–137° C. An aqueous spray containing 300 parts of this compound as sole toxicant per million parts spray by weight, applied to young bean plants which are subsequently sprayed with an inoculum of live southern bean mosaic virus, affords commercially valuable protection from the virus; yet at approximately 2500 parts per million the compound is non-toxic to the bean plants.

EXAMPLE II

In procedures essentially the same as the foregoing, but using 25.6 grams p-fluorobenzenethiol as halothiol reactant there is prepared a 1,4-bis(p-fluorophenylthio) benzene having a molecular weight of 327.4. By the employment of m-fluorobenzenethiol there is prepared 1,4-bis(m-fluorophenylthio)benzene, an isomer of the foregoing compound.

EXAMPLE III

A reaction mixture is prepared, containing, as liquid reaction medium, catalyst, and hydrogen halide acceptor, 150 grams cuprous oxide, 1.2 liters quinoline, and 125 milliliters pyridine. This mixture is placed in a flask, under reflux condenser, with entry port for the introduction of reactants, means for stirring, controlled heating, observation of temperature and, with the said reflux condenser, a water trap. In this situation, there is introduced thereinto, firstly, 0.1 gram-mole of 1-bromo-4-iodobenzene and, secondly, 0.1 gram-mole p-bromobenzenethiol. The resulting reaction mixture is heated at its reflux temperature (a pot temperature between approximately 200 and 240° C.) for 6 hours to carry to completion a first step reaction.

To the mixture resulting from the said first step there is added 0.09 gram-mole of p-chlorobenzenethiol. Heating under reflux and stirring are continued for 6 hours further to carry to completion a second step reaction, to prepare a product of the present invention.

At the end of the entire reaction period, the resulting hot mixture is poured into a mixture of shaved ice and excess concentrated hydrochloric acid. As a result of these procedures the ice melts and basic substances react with hydrochloric acid; in the resulting acidified water a precipitate forms. The precipitate is collected by filtration and is extracted with boiling toluene, the toluene extract liquid being saved. This liquid is dried over a bed of anhydrous potassium carbonate which neutralizes any remaining acidic traces and the resulting liquid is warmed to vaporize and remove toluene solvent and obtain a 1-(p-bromophenylthio)-4-(p-chlorophenylthio)benzene product as a glassy solid. The product has a molecular weight of 404.8.

In similar preparations there are produced other products of the present invention of which the α and Ω halogen substituents are dissimilar.

EXAMPLE IV

In this embodiment of the present invention, 25.6 grams (0.2 mole) p-fluorobenzenethiol is caused to react with 57.5 grams (0.1 mole) of p-bis(m-(p-(chlorophenylthio))phenylthio)benzene.

The latter compound is prepared by reaction of 1 molar equivalent bis(m-bromophenylthio)benzene with two molar equivalents p-chlorobenzenethiol according to the present procedures.

The reaction is carried out essentially according to the methods hereinbefore detailed. The resulting product is soluble in carbon disulfide and benzene. It is toxic to such plant disease fungi as tomato early blight. The said product is p-bis(m-(p-chlorophenylthio)phenylthio)phenylthio)benzene.

EXAMPLE V o-Chlorobenzenethiol (23.5 grams, 0.1 mole) is caused to react with o-dibromobenene, under conditions essentially as set forth in Example I. The resulting product is o-bis(o-chlorophenylthio)benene. The compound is fungicidal. It has a molecular weight of 360.34.

Various of the halobenzenethiols necessary as starting materials in the practice of the present invention are articles of commerce. However, those which are not can readily be prepared in known procedures such as, for example, the method of Hübner and Alsberg, see Liebig's Annalen der Chemie, volume 156, pages 308, 332, 344–359, note especially page 327 and following where the authors show the hydrogenation of a halobenzenesulfonyl halide. Other methods are known to those skilled in the art.

The dihalobenzenes, for example 1-iodo-4-bromobenzene, are articles of commerce.

I claim:

1. A compound corresponding to the formula

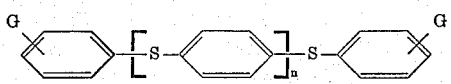

wherein $n$ represents an integer from 1 to 7, inclusive, and G is a halogen of atomic weight from 10 to 100, inclusive.

2. 1,4-bis(p-chlorophenylthio)benzene.

3. 1,4-bis(p-fluorophenylthio)benzene.

4. 1 - (p - bromophenylthio)-4-(p-chlorophenylthio)benzene.

5. p - Bis(m-(p-(chlorophenylthio)phenylthio)phenylthio)benzene.

6. o-Bis(o-chlorophenyl)benzene.

No references cited.